United States Patent
Smith

[15] 3,703,038
[45] Nov. 21, 1972

[54] COMBINATION ROTATABLE OIL DIP STICK AND WIPER

[72] Inventor: Carroll G. Smith, P.O. Box 188, Arco, Idaho 83213

[22] Filed: May 3, 1971

[21] Appl. No.: 139,489

[52] U.S. Cl. .................................33/126.7 R, 15/210 B
[51] Int. Cl. ..................................................G01f 23/04
[58] Field of Search .................33/126.7 R; 15/210 B

[56] References Cited

UNITED STATES PATENTS

| | | | |
|---|---|---|---|
| 2,127,835 | 8/1938 | Tower | 33/126.7 R |
| 2,314,430 | 3/1943 | Smith | 33/126.7 R |
| 3,316,647 | 5/1967 | Swallert | 33/126.7 R |
| R26,422 | 7/1968 | Stade et al. | 33/126.7 R |

FOREIGN PATENTS OR APPLICATIONS

| | | | |
|---|---|---|---|
| 297,537 | 6/1932 | Italy | 33/126.7 R |

*Primary Examiner*—William D. Martin, Jr.
*Attorney*—John W. Kraft

[57] ABSTRACT

The dip stick gauge of this invention includes a wiper housing at the entranceway of a fluid tank or reservoir having a multiplicity of resilient annular wiper rings engageable with the dip stick gauge being operable to wipe fluid residue from the gauge when it is removed from the tank or reservoir. The dip stick gauge assembly includes a hollow tubular housing having an opening in one of its side walls. A gauge rod is disposed in the tubular housing and includes indicia on one of its side walls coincident with the opening in the housing. Means is provided at one of the terminal ends of the rod being operable to rotate the rod in the housing out of the opening so that fluid residue on the rod on the indicia will not be wiped from the indicia as the dip stick wiper gauge is removed from the wiper housing.

3 Claims, 3 Drawing Figures

PATENTED NOV 21 1972 3,703,038

CARROLL G. SMITH INVENTOR.

BY *John W. Kraft*

COMBINATION ROTATABLE OIL DIP STICK AND WIPER

FIELD OF INVENTION

This invention relates to dip stick gauges for fluid tanks and reservoirs, and more particularly to a combination rotatable dip stick gauge and wiper.

BRIEF DESCRIPTION OF THE PRIOR ART

Fluids in tanks and reservoirs have been commonly measured with sticks emersed in the tank or reservoir. The quantity of fluid in a tank or reservoir is determined by the level of fluid residue remaining on the stick when it is removed. Usually indicia on the stick are provided to indicate desired preselected levels or quantity of fluids in the tank or reservoir and to indicate amounts of fluids required to be introduced into the tank or reservoir to bring the fluid to a desired level. The usual process by which fluids are measured is to remove the stick from tank or reservoir and wipe clean with a cloth or rag. The stick is then replaced and removed again to determine the actual level of fluid. It has been found that a substantial amount of fluid is removed from the tank or reservoir from repeated readings being made and frequently contaminants are introduced into the fluid tank or reservoir from the cloth or rag used. Since many fluids measured in this manner are inflammable and combustible, an extra hazardous condition is created by an accumulation of cloths or rags used for this purpose, such as, for example, in service stations and automotive service shops.

Accordingly, it is an extremely important object of this invention to provide a dip stick gauge including a wiping means integral with a fluid tank or reservoir.

Another object of this invention is to provide in a combination dip stick gauge and wiping means, means retaining fluid residue on the gauge portion thereof.

These and other objects shall become apparent from the description following, it being understood that modifications may be made without affecting the teachings of the invention here set out.

Generally, the dip stick gauge of this invention includes a wiper housing at the entranceway of a fluid tank or reservoir having a multiplicity of resilient annular wiper rings engageable with the dip stick gauge being operable to wipe fluid residue from the gauge when it is removed from the tank or reservoir. The dip stick gauge assembly includes a hollow tubular housing having an opening in one of its side walls. A gauge rod is disposed in the tubular housing and includes indicia on one of its side walls coincident with the opening in the housing. Means is provided at one of the terminal ends of the rod being operable to rotate the rod in the housing out of the opening so that fluid residue on the rod on the indicia will not be wiped from the indicia as the dip stick wiper gauge is removed from the wiper housing.

A more thorough and comprehensive understanding may be had from the detailed description of the preferred embodiment when read in connection with the drawings forming a part of this specification.

DESCRIPTION OF THE PREFERRED EMBODIMENT

Figure 1:
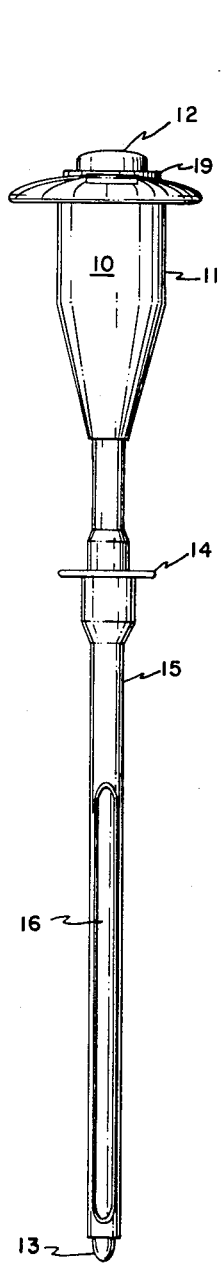
FIG. 1 is a side elevational view of the dip stick gauge of the present invention showing to advantage the indicia on the gauge rod out of opening in the side wall of the tubular housing and the gauge rod plunger rotating assembly in a depressed downward position.
Figure 2:
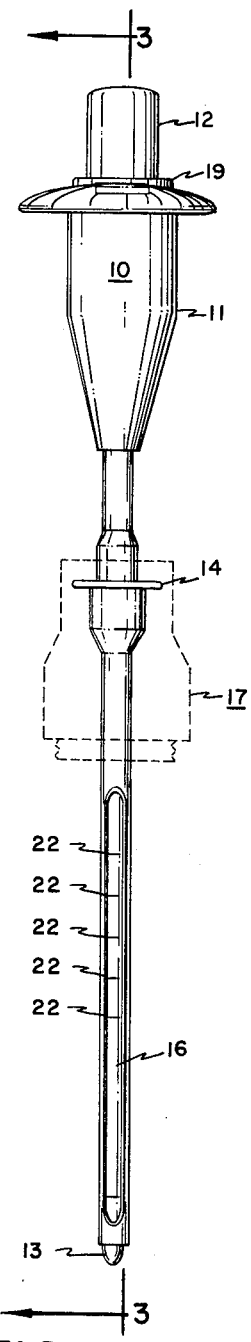
FIG. 2 is a side elevational view of the dip stick gauge showing to advantage indicia on the gauge rod in the opening of the tubular housing, the plunger assembly in its normal upward position and the wiper housing of the invention shown in broken lines for illustrative purposes.

Referring now to the drawings and more particularly to the FIGS. 1 and 2 which advantageously show the dip stick of the present invention generally identified by the numeral 10. The elements of the stick 10 may be conveniently identified by the several subassemblies, namely an operating housing 11 including an operating mechanism plunger 12 operatively connected to a gauge rod 13, a cap 14 and a rod housing 15 having a gauge opening 16. The invention also includes a wiper closure assembly 17 shown in broken lines in the FIG. 2 for illustrative purposes and herein later more fully described.

Figure 3:
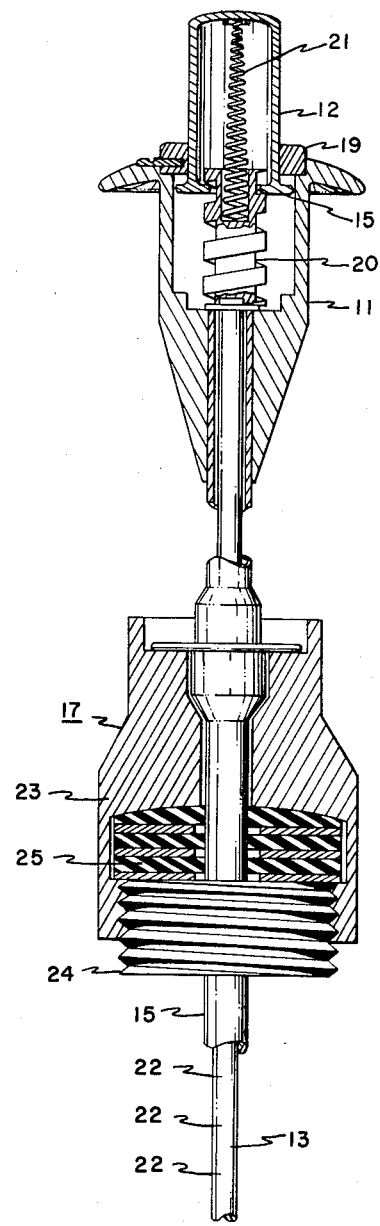
FIG. 3 is a cross sectional side elevational view of the uppermost portion of the dip stick gauge rod and wiper housing of this invention taken substantially along the lines 3-3 of the FIG. 2 and drawn to a larger scale.

Referring now to the cross sectional elevational view of the FIG. 3 drawn to a larger scale, the plunger 12 comprises a cup-like hollow cylindrical body having a substantially T-shaped flange portion 18 around its terminal end. The plunger 12 is retained in the housing by an annular ring 19 suitably fastened in the housing 11. The gauge rod 13 is provided with a threaded portion 20 suitably fastened to a terminal end of the rod 13 in the operating housing 11. The innermost terminal edge of the flange portion 18 is operatively and threadably engaged by the portion 20 so that the rod 13 is caused to rotate in response to the upwardly and downwardly movement of the plunger 12. A spring 21 is disposed between the end wall of the plunger 12 and the threaded portion 20 tending to normally urge the plunger 12 upwardly with respect to the operating housing 11. The gauge rod 13 is distally disposed in the rod housing 15. The rod 13 is provided with a plurality of indicia 22 on portions of the side wall of the rod 13 for the determination of the level of fluids in a tank such as an oil reservoir. The indicia 22 are distally disposed on the rod 13 so that they are normally disposed on the rod 13 adjacent the gauge opening 16 so that they are exposed in fluids and visable for observation when the plunger 12 is in its normal uppermost position substantially as shown to advantage in the FIG. 2.

Referring again to the FIG. 3 the wiper closure assembly 17 includes a substantially cylindrical body portion 23 adapted to receive the gauge rod housing 15 therethrough and to engage the cap 14 at one of its terminal ends, and a threaded pipe nipple 24 at its opposite terminal end. The nipple 24 is adapted to threadably fasten the assembly 17 to a fluid tank or reservoir. A multiplicity of annular wiper rings 25 fabricated from resilient material such as felt, rubber, plastic material or the like is disposed in the closure assembly housing 17 between the end wall thereof and the nipple 24. As the nipple 24 is threadably tightened in the housing 17 the wiper rings 25 tend to be compressed and urged about the gauge rod housing 15. Hence, as the dip stick 10 of this invention is removed from the housing 17 it tends to be wiped clean of fluids on the gauge housing 15 and the portion of the rod 13 in the opening 16 by the ring 25.

In operation the plunger 12 is manually depressed or moved downwardly causing the gauge rod 13 to be rotated as earlier disclosed. The indicia 22 on the rod 13 are consequently caused to be rotated in the gauge rod housing 15 substantially as shown in the FIG. 1. As the dip stick 10 is removed out of the wiper closure assembly 17 the gauge rod housing 15 and the exposed portion of the gauge rod 13 in the opening 16 tend to be wiped clean of fluids in the tank or reservoir by the wiper rings 25. After the dip stick 10 is removed, the plunger 12 may be released and urged upwardly by the spring 21 causing the rod 13 to rotate in the gauge rod housing 15 and expose the indicia 22 on the rod 13 in the opening 16. The indicia 22 having been protected by the housing 15 so that fluid could not be removed by the wiper rings 25, a residue of fluids remains on the rod 13 at the level of the fluid on the rod in the tank. Hence, determination of the level of oil in a tank or reservoir may be determined.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. In a dip stick gauge and wiper assembly the combination of a wiper housing suitably fastened to a fluid tank and reservoir, a dip stick gauge assembly engageable in said wiper housing and being extendable therethrough and into said tank and reservoir, said wiper housing including a multiplicity of resilient annular wiper rings in said housing, means urging said wiper rings about said dip stick gauge, said dip stick gauge including a housing, a gauge rod disposed in said housing, said housing having an opening in one of the side walls of said housing, said gauge rod being provided with indicia on a wall of said rod normally adjacent said opening of said gauge rod housing, means operable to rotate said rod in said housing.

2. The apparatus of claim 1 in which said means operable to rotate said rod includes a substantially cylindrical threaded portion suitably fastened at one of the terminal ends of said gauge, a plunger slidably carried in one of the terminal ends of said housing, said plunger including a flange operatively engaging said threaded portion, means normally urging said plunger upwardly.

3. The apparatus of claim 1 including a closure portion distally disposed on said housing engageable with said wiper housing.

* * * * *